(12) United States Patent
Branco

(10) Patent No.: US 11,573,910 B2
(45) Date of Patent: Feb. 7, 2023

(54) APPARATUS, SYSTEM AND METHOD TO DEFINE MEMORY INFORMATION LEAK ZONES IN A COMPUTING SYSTEM

(71) Applicant: Intel Corporation, Santa Clara, CA (US)

(72) Inventor: Rodrigo Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 16/548,777

(22) Filed: Aug. 22, 2019

(65) Prior Publication Data

US 2020/0264988 A1 Aug. 20, 2020

(51) Int. Cl.
| | | |
|---|---|---|
| *G06F 12/14* | (2006.01) | |
| *G06F 12/06* | (2006.01) | |
| *G06F 9/30* | (2018.01) | |
| *G06F 21/55* | (2013.01) | |
| *G06F 21/57* | (2013.01) | |

(52) U.S. Cl.
CPC ...... *G06F 12/1441* (2013.01); *G06F 9/30145* (2013.01); *G06F 12/0646* (2013.01); *G06F 21/556* (2013.01); *G06F 21/57* (2013.01); *G06F 2212/1052* (2013.01); *G06F 2221/034* (2013.01)

(58) Field of Classification Search
CPC ............. G06F 12/1441; G06F 9/30145; G06F 12/0646; G06F 21/556; G06F 21/57; G06F 2212/1052; G06F 2221/034; G06F 9/30076; G06F 21/55; G06F 21/52; G06F 12/1416; G06F 12/1408; G06F 12/1475; G06F 21/577; G06F 21/78
See application file for complete search history.

(56) References Cited

U.S. PATENT DOCUMENTS

| | | | |
|---|---|---|---|
| 5,941,980 A | * | 8/1999 | Shang ................. G06F 9/30152 712/213 |
| 6,275,938 B1 | | 8/2001 | Bond et al. |
| 2013/0091318 A1 | | 4/2013 | Bhattacharjee et al. |
| 2019/0196939 A1 | * | 6/2019 | Lengauer ............ G06F 11/3495 |

(Continued)

OTHER PUBLICATIONS

EPO; Office Action issued in EP Patent Application No. 20181201.3, dated Jan. 25, 2022; 5 pages.

(Continued)

*Primary Examiner* — Mohammad W Reza
(74) *Attorney, Agent, or Firm* — Alliance IP, LLC

(57) ABSTRACT

An apparatus of a computing system, a computer-readable medium, a method and a system. The apparatus comprises processing circuitry including a core, and a communication controller coupled to the core to communicate with a memory of the computing system, wherein the memory is to define a leak zone corresponding to a plurality of memory addresses including data therein, the leak zone having an identifier; and the processing circuitry is to: decode instructions including a starting leak barrier, an ending leak barrier, and a sequence of code between the starting and ending leak barriers, the sequence of code including the identifier for the leak zone, the identifier to indicate the sequence of code is to be executed only on the data within the leak zone; and execute the sequence of code only on the data within the leak zone based on the leak barriers and on the identifier.

25 Claims, 6 Drawing Sheets

(56) References Cited

U.S. PATENT DOCUMENTS

2020/0285476 A1* 9/2020 Bolbenes .............. G06F 9/3848
2020/0409750 A1* 12/2020 Ould-Ahmed-Vall ......................
G06F 9/4881

OTHER PUBLICATIONS

EPO; Extended European Search Report issued in EP Patent Application No. 20181201.3, dated Dec. 10, 2020; 9 pages.
Immunity, Inc., "Cloudburst," Copyright 2008-2009; last updated Jun. 2, 2019 (15 pages).
Kortchinsk, Kortchinsky, "Cloudburst: A VMware Guest to Host Escape Story," Immunity, Inc., Black Hat USA 2009; available online at https://www.blackhat.com/presentations/bh-usa-09/KORTCHINSKY/BHUSA09-Kortchinsky-Cloudburst-SLIDES.pdf; published; Jun. 29, 2009 (48 pages).
Number Seven of a Series, "Drinking from the Firehose, Defense Against Malice and Error-Security and Reliability in the Mill CPU Architecture," Out-Of-The-Box-Computing, Mar. 21, 2014 (66 pages).
Rubens, Paul, "Review: McAfee Deep Defender," eSecurity Planet, Aug. 23, 2012, available online at https://www.esecurityplanet.com/windows-security/review-mcafee-deep-defender.html (9 pages).
Serna, Fermin J., "The Info Leak Era on Software Exploitation," Google, Black Hat 2012 (45 pages).
Wikipedia, "Time-of-Check to Time-of-Use," at least as early as Mar. 16, 2013; available online at https://en.wikipedia.org/wiki/Time-of-check_to_time-of-use. (3 pages).

\* cited by examiner

APPARATUS, SYSTEM AND METHOD TO DEFINE MEMORY INFORMATION LEAK ZONES IN A COMPUTING SYSTEM

TECHNICAL FIELD

This disclosure relates in general to the field of computing platform security and, more particularly, to protection against memory information leaks in computers.

BACKGROUND

Memory information leaks in computing system, such as, for example, in a Virtual Machine Monitor (VMM) or Hypervisor, or such as in a Central Processing Unit (CPU), may be caused by at least two issues: (1) the first involves an allocation-without-deallocation issue: where allocations within the memory are not de-allocated even after execution of code on data stored therein; allocations without de-allocations essentially keep certain addresses within the memory still in use without such addresses being necessary, thus affecting the performance of a computing system; and (2) the second involves impermissible access, or access to parts of the memory, such as to pages and associated addresses within the memory, by instructions that do not have permission for such access; impermissible access may be brought about for example by way of reminiscent data (e.g. data that has not been properly and/or totally deleted), by way of a type confusion vulnerability (where an object associated with a first type of data is treated as being associated with a second type of data, in which case a data of the second type may be impermissibly accessed by an object of the first type of data). Improvements are needed that address the above issues, and especially with respect to the issue of impermissible access.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EMBODIMENTS

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computing systems, desktop computing systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
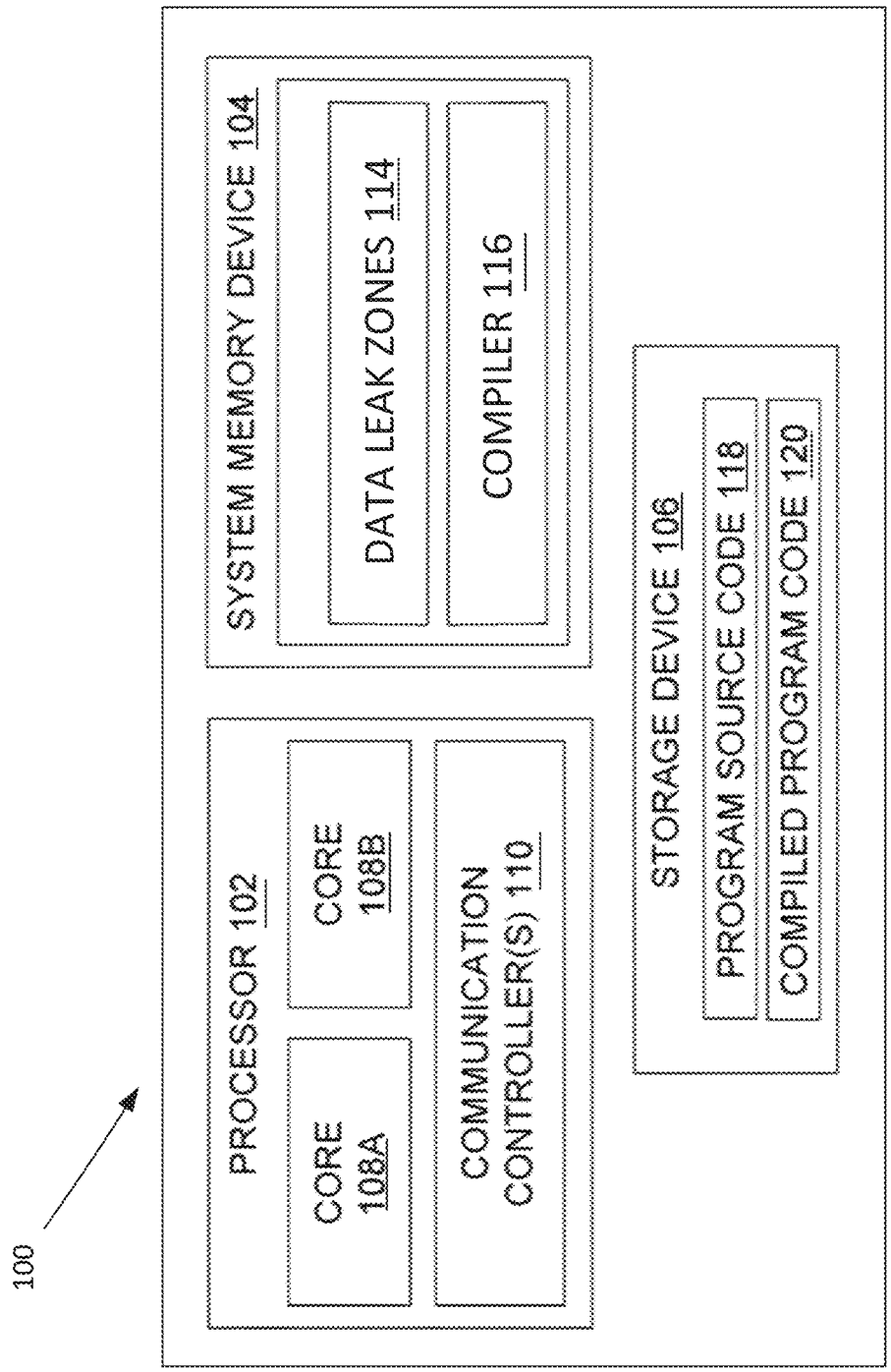
FIG. 1 illustrates a computing system to compile a program in accordance with certain embodiments.

FIG. 1 illustrates a computing system 100 to compile a program in accordance with certain embodiments. Computing system 100 includes a processor 102, a system memory device 104, and a storage device 106. Processor 102 may include any processor or processing device, such as a microprocessor, an embedded processor, a digital signal processor (DSP), a network processor, a handheld processor, an application processor, a co-processor, an SoC, or other device to execute code. Processor 102 may include one or more cores (e.g., 108A and 108B). In a particular embodiment, processor 102 is implemented on a single die. In another embodiment, processor 102 is implemented on a plurality of dice. Processor 102 may communicate with system memory device 104 and storage device 106 via communication controller(s) 110.

In operation, processor 102 may execute a compiler 116 within the system memory. For example, code of the compiler 116 may be loaded into system memory device 104 (e.g., from storage device 106) and executed by one or more of the cores 108. In addition, the system memory may define data leak zones 114 corresponding to sets of addresses including data, the sets of addresses corresponding to respective sets of code sequences to be executed on the data. Further details regarding the leak zones and regarding the manner of using the same will be provided below in the context of embodiments.

The instant disclosure provides solutions to address the issue of impermissible access as described above, and in general security vulnerabilities that may result in an attacker having the ability to access areas in memory not intended to be accessible. Those vulnerabilities are oftentimes used to bypass other security mitigation mechanisms, such as address space layout randomization (ASLR).

Privilege escalation and remote code execution vulnerabilities are a challenging problem to solve. The difficulties arise not only from the problem of separating data and code (in a non-Harvard, legacy concerned architecture), but also from the challenge of defining an order of execution of instructions on data with a memory. The mixing of control structures on the one hand and data on the other hand can lead to an increase in the exposure of bugs in code sequences, thus allowing attacker to control the flow of code sequence execution. Most current techniques that aim to deal with the above issues do not take into consideration virtualized environments in the sense of protecting the hypervisor or VMM itself. Virtualized environments involving VMMs/hypervisors present complex security issues and can be more prone to attacks. In the case traditional virtualization, current techniques that primarily aim to protect attacks inside a guest (virtual machine) environment are usually ineffective in preventing privilege escalation from the guest to the host (computer on which a hypervisor is running) in the case of bugs existing in the VMM. Some current solutions aim to create isolation of guest applications and protecting guest applications from the guest Operating System (OS), and also from a malicious host. However, such solutions do not protect the VMM itself in the case of VMM vulnerabilities with respect to attacks from the guest. The reason for the above is that the guest memory layout exists in the memory of the host, which memory typically makes arbitrary read/writes very predictive for large portions of the memory. The latter among other things means that means ASLR may not fully benefit the hypervisor. Also, the typical complexity of the VMM code tends to create a larger exposure area within the host memory, which can increases security risks as a result.

Embodiments provide a solution to the above problems by providing a way for the hypervisor to isolate instructions that are to be executed on guest data within the host memory while at the same time avoiding cross-access (as between sets of code sequences such as, for example, sets of code sequences from respective guests) to the host memory areas that are not to be exposed/accessed (this creates a side effect of also avoiding arbitrary code execution out of the context due to the isolation). It is to be noted that embodiments concern circumstances where a vulnerability does in fact exist, and are therefore have containment (or making the vulnerability non-exploitable) as one of their goals.

Embodiments advantageously permit a computing system, such as a host implementing a hypervisor/VMM, to carry out its functions without design changes to allow those functions to be implemented, and without a negative performance impact. Embodiments are also compatible with the Virtual Machine (VM) Function instruction (VMFunc), which instruction exposes additional functionalities within hypervisors in different instruction flows—without causing the VM to exit (i.e. without generating a VMexit).

Some embodiments pertain to an apparatus of a computing system. The apparatus may for example includes a processing circuitry such as processor 102 of FIG. 1, and may include one or more cores, such as cores 108A and 108B, and one or more communication controllers such as communicate controller 110 of FIG. 1, to communicate with a memory of the computing system. The computing system may include a computer, such as, for example, a host computer running a hypervisor/VMM. The core may be coupled to the memory to access data in the memory by way of the communication controller. The memory may include a system memory, such as system memory device 104 of FIG. 1. The memory may be configured to define a leak zone therein, such as a leak zones within leak zones 114 of FIG. 1, the leak zone corresponding to a plurality of memory addresses including data therein. The memory may include virtualized memory. The memory addresses may be physical addresses within a main/system memory, such as system memory 104 of FIG. 1, or they may be virtual addresses, such as logical virtual memory addresses generated by the host. The leak zone may have an identifier to identify the same. The processing circuitry may, according to some embodiments, be configured to decode instructions, such as instructions from compiler 116 of computing system 100, the instructions defining a leak barrier corresponding to a sequence of code to be executed only on data with the leak zone. The leak barrier may include a starting leak barrier to indicate a start of the same, an ending leak barrier to indicate an end of the same, and a sequence of code between the starting and ending leak barrier. The sequence of code may include the identifier for the leak zone. When executing the sequence of code, the processing circuitry would know from the identifier that the sequence of code is to be executed only on the data within the leak zone with the same identifier. The processing circuitry may therefore execute the sequence of code only on the data within the leak zone based on the leak barriers and on the identifier.

Figure 2:
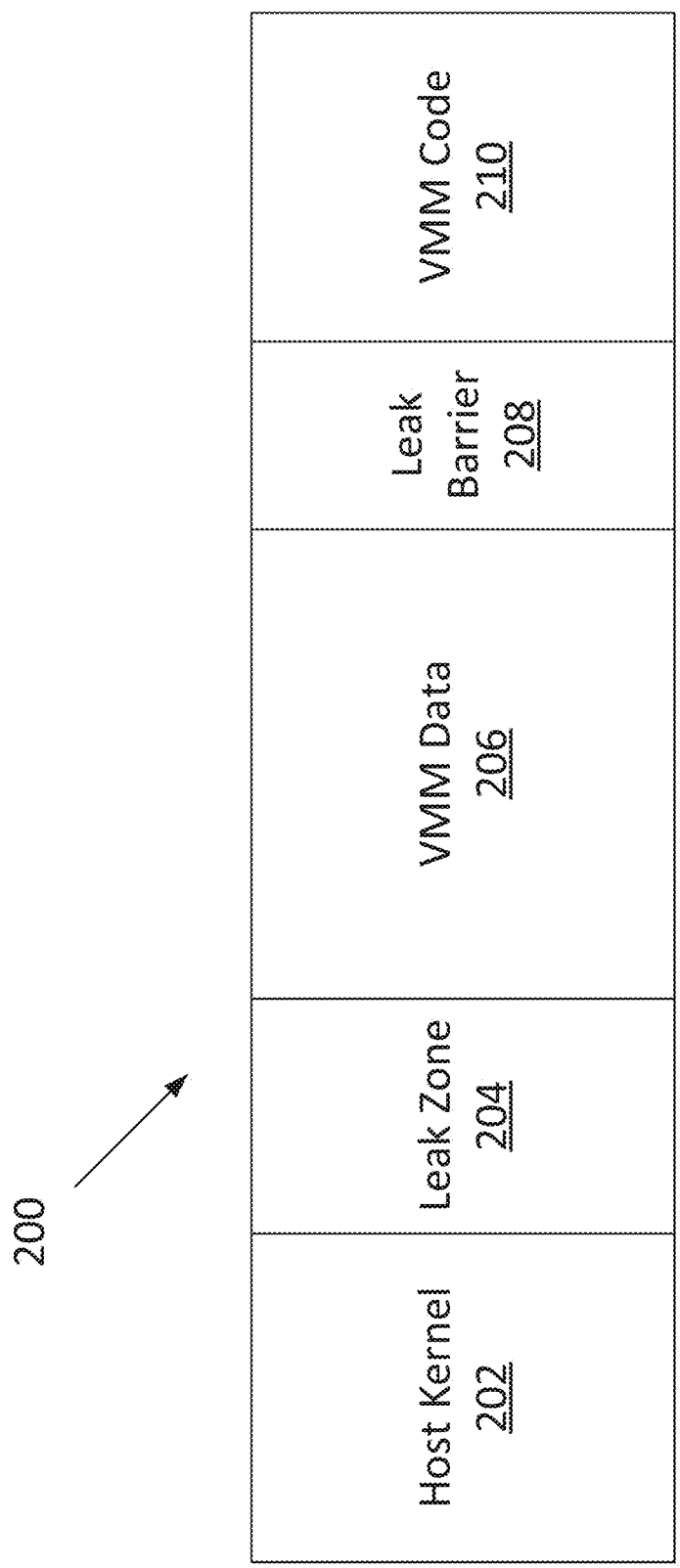
FIG. 2 illustrates a Virtual Machine Ma (VMM) memory layout in the context of a host in a virtual environment according to some embodiments.

With respect to some demonstrative embodiments, reference is now made to FIG. 2, which provides a schematic depiction of a VMM (logical) memory layout 200 of a VMM/hypervisor. The layout in FIG. 2 is to therefore depict an application of embodiments to a virtual environment, whereas the layout in FIG. 1 depicts an application of embodiments to a physical environment including a system memory rather than a virtual memory implemented by a VMM. As seen in FIG. 2, the VMM memory layout 200 may include a host kernel 202, a leak zone 204 accessible only to code within a leak barrier, VMM data 206 corresponding to virtualized guest memory areas, a leak barrier 208 including a sequence of code that can access only data within the leak zone 204, and VMM code 210.

According to some embodiments, the starting leak barrier and the ending leak barrier may respectively correspond to instructions including "lbstart" and "lbend", and the identifier corresponds to an instruction including "per-pte". In some embodiments, the identifier may include an integer, and the leak zone may in turn include a plurality of pages corresponding to the addresses defining the leak zone, each of the pages having a mark corresponding to the integer. According to some embodiments, there may be a number of starting leak barriers or "lbstarts" corresponding to a given leak zone, while one ending leak barrier, or one "lbend" would serve to designate the end of the sequence of code for the leak zone for all of the "lbstarts" that designate that leak zone.

According to some embodiments, there may be more than one leak zone within a memory, and therefore more than one set of instructions that includes a leak barrier. Embodiments contemplate a plurality of leak zones each having its own identifier, and a plurality of leak barriers as part of respective instructions to be executed on data within respective ones of the leak zones. Where respective instructions are to be executed on data within respective ones of a plurality of leak zones within a memory, each sequence of code corresponding to each of the respective instructions may associate the identifier (such as the integer) with each of the starting leak barrier and ending leak barrier defined therein. Thus, a first sequence of code may include a first identifier (corresponding to a first leak zone) for a first starting leak barrier, and the first identifier again for a first ending leak barrier. A second sequence of code may include a second identifier (corresponding to a second leak zone) for a second starting leak barrier, and the second identifier again for a second ending leak barrier. In this manner, the first sequence of code and the second sequence of code may be nested with respect to one another.

According to some embodiments, the computing system may include a host to implement a hypervisor; the first instructions and the second instructions may be associated, respectively, with a first guest and a second guest, the first guest and the second guest in a computing network including the host; and the first sequence of code and the second sequence of code may each include, respectively, a first offset instruction and a second offset instruction. Each offset instruction, when executed, is to implement an offset with respect to one or more memory addresses in the memory corresponding to a leak zone. An offset instruction, may, according to some embodiments, include an address space layout randomization (ASLR), although embodiments are not so limited, and may include any offset implemented with respect to memory addresses. The processing circuitry may, according to one embodiment, be configured to execute the first offset instruction to perform a first address space layout randomization (ASLR) on the first leak zone based on a first offset; and execute the second offset instruction to perform a second address space layout randomization (ASLR) on the second leak zone based on a second offset different from the first offset. An "offset" as used herein may refer to a single instance of randomization to be applied in accessing memory addresses within a leak zone, or to a number of instances of randomization to be applied in accessing memory addresses within a leak zone. The first leak zone and the second leak zone may be configured to store information on, respectively, the first offset and the second offset.

According to some embodiments, the processing circuitry is to decode and execute flow instructions to zero the first offset (to undo the first offset) between an execution by the processing circuitry of the first offset instruction and an execution by the processing circuitry of the second offset instruction. In other words, according to embodiments, the processing circuitry may zero an offset between execution successive sequences of code, such as from different guests within a computer network.

According to some embodiments, the offset may be implemented by way of a randomization offset register, wherein the first offset instruction and the second offset instruction are from the randomization offset register, the randomization offset register to store the first offset and the second offset.

According to one embodiment, the offset may be applied to the register proper, meaning that an offset could be applied to information stored in the register.

According to some embodiments, the offset may be implemented by way of a code segment register, the code segment register to store the first offset and the second offset One aim of embodiments is to define a memory area, referred to herein as a "leak zone," in a host memory of a host, or in a system memory of a computing system, data in the leak zone being accessible only by a sequence of code inside a "leak barrier." According to some embodiments, a leak barrier may be defined by two instructions including a starting leak barrier (e.g. "Ibstart") and an ending leak barrier (e.g. "Ibend"), where an "Ibstart" marks the beginning of a sequence of code that is inside the leak barrier, and an "Ibend" marks the end of the sequence of code inside the leak barrier. Each of the "Ibstart" and "Ibend" may, according to some embodiments, define which a leak zone that a corresponding sequence of code can access. For example, the instructions may include an identifier associated with the "Ibstart" and the same identifier associated with the "Ibend" to serve two related functions: (1) to define which Ibstart and which Ibend correspond to one another (that is, start a given sequence of code for a related leak zone, and end the same sequence of code the related leak zone); and (2) to identify the leak zone for the given sequence of code. Using a mechanism such as the one described above to associate a given leak zone identifier with both starting leak barrier and ending leak barrier for the same leak zone advantageously allows a nesting of sequences of code that may be targeting distinct leak zones within the memory address space. The identifier may for example include an integer. According to one embodiment, each page in a leak zone may include a mark that defines the integer that the sequence of code within a barrier must refer to access the data within the leak zone.

In order to implement an offset according to some embodiments, an apparatus according to embodiments may include a randomization offset register (or randomization_offset register). The randomization offset register may, according to one embodiment, provide ASLR between guest accesses to the memory in the host. The offset instruction (or code that defines the offset), may be within a leak barrier, and the offset in use may be saved in a leak zone. Any vulnerabilities within the computing system implementing an offset would advantageously not leak the offset of the randomization because of the leak barrier. Therefore, attacks by a guest will need to defeat the randomization implemented, such as, for example, ASLR, which already exists in modern computing systems. According to one embodiment, flow instructions may zero the randomization_offset register between guest accesses in order to provide added security against unauthorized accesses to a given leak zone. Used in conjunction with, for example, Intel's Control-Flow Enforcement Technology, CET, the above offset mechanism provides a leak-safe, control-flow protection and provides the segmentation of different pieces a computing system instructions and associated memory space, making it quite hard to find tuning-complete targets to redirect flow, for example with end-branch marks.

One of the more important challenges of a hypervisor arises from the relatively large amount of memory space as implemented by the hypervisor that is to be shared among a comparably large number of different guests within a computer network. Since randomization of large areas within a memory is difficult to execute, memory layouts of hypervisors are hardly if ever randomized, making a virtualized environment apt to be exploited by attackers, for example in the form of impermissible memory access. The implementation of a randomization offset register is to make randomization of offsets within a large memory space easier, allowing the hardware to implement the same by repositioning the code in memory space. For example, a hypervisor may write a Model Specific Register (MSR) instruction to communicate the new offset. The hardware can automatically use the MSR instruction to implement the offset.

Reference is now made to a real scenario to demonstrate a Cloudburst vulnerability of a prior art cloud environment. The VMM here exposes two functionalities, one for reading data from a buffer and the other to write data from the same buffer. The exposed functionalities are similar to: a.

copy_video_data (buffer_guest, buffer_vmm, size_guest_defined); b. read_video_data (buffer_guest, buffer_vmm, size_guest_defined). The first (copy) functionality copies data from the guest memory area (mapped in the host area) to a memory area that is not guest-accessible (to avoid Time-Of-Check To Time-Of-Use (TOCTOU) attacks). The problem here however is that the buffer size is defined by the guest. Thus, if the buffer is bigger than the host allocated space, the guest will overwrite unexpected data. The second (read) functionality is very similar to the first, except that it will read data from a memory area in the host corresponding only to the guest buffer. The problem here however is that, again, the size of the guest buffer is guest-defined, and thus if this size is bigger than the expected, the guest will read arbitrary/impermissible data. Embodiments however avoid the above issue as the leak barrier is defined not at the guest level, but at the host when embodiments are applied in a virtual environment.

Another remaining scenario involves a situation where a pointer that is controlled by an attacker is dereferenced. The latter concerns the allocation-without-deallocation issue noted above corresponding to a use-after-free vulnerability. If we assume the attacker hijacks the flow of execution in the VMM context, the attacker may try to modify the leak barriers described above (since he/she cannot execute his/her own code as a result of the leak barriers) using out-of-order execution. To succeed in using out-of-order execution, he/she would however need to return to known positions in the memory, and ASLR as it is applied today is usually not effective because the attacker in a VMM-scenario controls large portions of consecutive memory (the guest memory) that exists in the host memory. However, using an offset, such as one implemented by a randomization offset register or by a code segment register, as described herein and according to some embodiments, can serve to control the location of that portion of memory on the host side. Since the attacker cannot access data inside the leak zone, he/she will not have a way to know the value of the offset stored therein. Additionally, in an embodiment, in flow changes involving code execution, such as between two code sequences associated with two respective guests in a virtual environment, where the offset for the leak zone corresponding to the first code sequence in a register is zeroed by the host, an only possible way to return to an appropriate segment of the memory for access would be to access the leak barrier, thus reducing the possibility of attacks, if not completely removing usable chains (that would depend on the VMM barrier code). When using a randomization offset register, memory references may, according to some embodiments, have the "randomization_offset:cs:eip" format. If using the CS register option mentioned above, the latter format is not necessary. According to some embodiments, flow control instructions may be used to zero the offset, such as the offset implemented by way of randomization_offset offset register, or by way of a CS register. The zeroing of the offset makes implementation of embodiments more advantageous in the context of compilers and or Operating Systems (OS's). According to one embodiment, the CS-only option may be implemented with a call-gate to a code in the leak-barrier that defines the CS to the randomized offset value.

Some demonstrative embodiments require hardware changes to a computing system, such as to a host implementing a hypervisor. Hardware changes are reflected in the changes to the instructions. The instructions/software need to change to implement the functionality to performed in the new hardware according to some embodiments.

Embodiments involve at least three main aspects: (1) the provision of leak zones within a memory: memory areas (such as per-page marks that respectively define an integer numbers), where the leak zones each have an identifier. The identifier may include an integer number as mentioned above. A "per pte" instruction may be used to indicate the memory addresses (whether physical or logical) corresponding to each leak zone, and the integer may associate such addresses to the sequence of code to be executed on data within the leak zone; (2) the provision leak barriers within instructions, including initialization/start and termination/end instructions that define the code block or sequence of code between them that is to access the leak zone specified in the parameters for the instruction (by way of the identifier for the leak zone); (3) optionally, a randomization offset that is used to access segments of memory, for example by way of a randomization offset register according to one embodiment. A randomization offset register, if used, may only be accessible in a leak barrier. The same can be implemented without an additional register, making for example the existing Code Segment (CS) register only mutable by way of code within a leak barrier. According to some embodiments, the latter may be possible to be defined per process (in order to maintain backward compatibility) or platform wide (and locked) at boot time. Accordingly, each computing system could decide whether or not to keep or break backward compatibility.

Some demonstrative embodiments allow hypervisor software to be divided in execution areas that handle data areas specific to the guests and execution areas that handle data of the hypervisor itself. Vulnerabilities in the hypervisor would then be contained, since one area would not be permitted to overflow into another area. Embodiments are possible without major software changes, which major software changes would have likely been necessary to implement the same functionalities described herein if a paging mechanism were to be used instead. Using a paging mechanism would have at least the below disadvantages: (1) any memory movement between areas would have required a special setup (kernel-mode components); (2) any code in the hypervisor would have needed to lead to a trap before a determination as to whether it would be permitted to access a given memory area, or the hypervisor itself would have needed to be implemented as guests with a VMM layer behaving like a micro-kernel passing messages and making the security decisions. The above would have led to a complex solution which could have impacted performance and cost of implementation.

Expected Limitations:

Some embodiments provide the capability of isolating pieces of data and code, creating a relation between which data is accessed by which part of code. The above capability, if provided in a performance-effective way, may advantageously be explored by programmers but most importantly by compiler developers to make decisions on the final layout of the execution flow (not only with respect to code, but also with respect to its relation to data areas within the memory). The above capability does not guarantee that a given data will not be incorrectly used by a given piece of code that is allowed to use it, but it will limit the usage of that data and where in the memory it is moved to, thus confining/limiting vulnerabilities. Although, according to some embodiments, some of the confined vulnerabilities may be exploitable by attackers, many will advantageously become un-exploitable. On the remaining exploitable scenarios, usual exploitation techniques will not suffice and the time to develop an exploit will increase, giving opportunities for discovery/patching in many cases.

According to some embodiments, proposed instructions may include at least one or more of the following:

(1) LBSTART, corresponding to a Leak Barrier Start or lbstart, corresponding to a memory size of any size, such as 2/4/8/16/32/64 bits or higher (Immediate value or Imm 2/4/8/16/32/64 or higher); the LBSTART or lbstart marks the start of a sequence of code that is to access a memory information leak zone defined by pages referenced within a leak barrier, as identified by Imm32/64; according to some embodiments, multiple consecutive calls to lbstart may be made to the same memory area, but one call to LBEND or (bend closes that page for all lbstarts associated with that memory area;

(2) LBEND corresponding to a Leak Barrier End or (bend, corresponding to a memory size of any size, such as 2/4/8/16/32/64 bits or higher (Imm 2/4/8/16/32/64 or higher); the LBEND or (bend marks the end of a sequence of code that is to access a memory information leak zone defined by pages marked by a leak barrier. Once (bend is encountered for a given identifier/mark for a leak zone, no code can access that leak zone anymore. Lbend, according to one embodiment, closes all access to a given page, even if multiple lbstart calls for that area have been issued previously;

(3) a "per-pte" page marking corresponding to a leak zone of any size, such as a size corresponding to Imm 2/4/8/16/32/64 or higher page marking; and (4) Model Specific Register (MSR) instructions for a randomization_offset register which may use, and may thus be read from and written to, using rdmsr/wrmsr instructions.

The above proposal of using Imm 2/4/8/16/32/64 for marking can be changed without affecting embodiments. Having a different memory size would only limit the amount of pages in the barriers, without compromising the overall benefit of the protection provided by embodiments. The memory size that is subject to the implementation of leak zones according to embodiments may be implementation specific. According to some embodiments, the identifier or integer may be provided in the per_pte instruction to identify a memory page for example. The size of the leak zone page associated with an identifier may for example be determined by going through the per_ptes an identifying how many have a given identifier.

As used herein, a "computing system" can include any electronic device, such as, by way of example and not limitation, a mobile device (e.g., smart phone, table, phablet, eBook reader, etc.), a personal computer, a laptop, a gaming system, an infotainment system in a vehicle (e.g., automobile, airplane, train, bus, subway, etc.), a wearable electronic device, an embedded device, and any other component, element, or object operable to implement any of the functions noted above. In other implementations, a computing system may include network elements such as servers, appliances, routers, processors, processing systems, hosts or any other suitable component, element, or object operable to implement the functions as described above.

Figure 3:
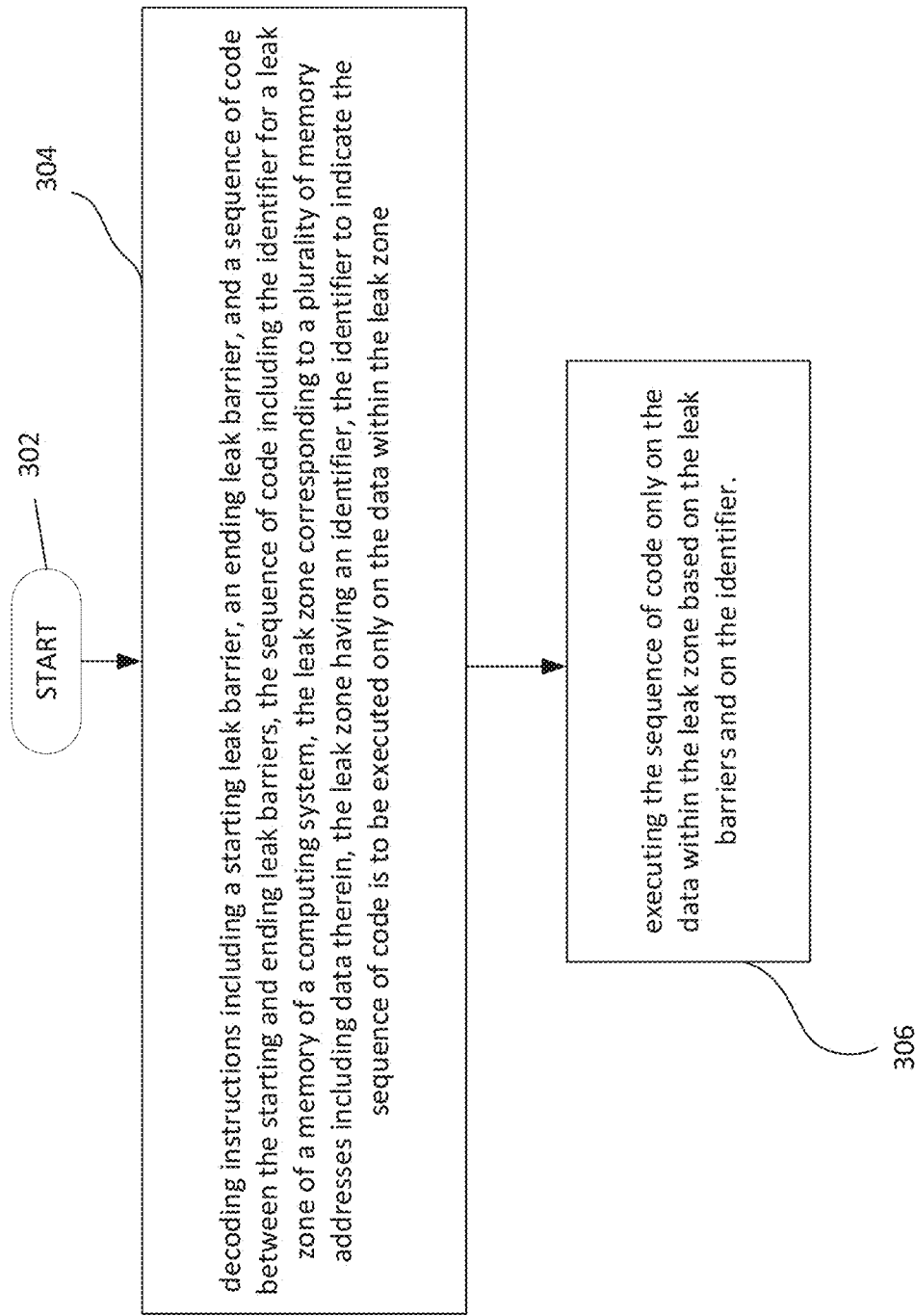
FIG. 3 is a simplified flow chart illustrating example operations according to some embodiments.

As seen in FIG. 3, a process 300 according to embodiments includes, at operation 302, decoding instructions including a starting leak barrier, an ending leak barrier, and a sequence of code between the starting and ending leak barriers, the sequence of code including the identifier for a leak zone of a memory of a computing system, the leak zone corresponding to a plurality of memory addresses including data therein, the leak zone having an identifier, the identifier to indicate the sequence of code is to be executed only on the data within the leak zone, and at operation 304, executing the sequence of code only on the data within the leak zone based on the leak barriers and on the identifier.

Advantageously, based on embodiments, vulnerabilities associated with impermissible access are less likely to be exploitable, even in a hypervisor environment. Prior art solutions may be bypassed by arbitrary memory reads that leak the memory location itself, or leak the base of the code, thus making it possible to exploit data within an address even where offsets are used. With leak barriers according to embodiments, such a leak is made much less probable and instrumenting the code is made possible via basic code modification. Using the principles of leak zones according to embodiments, it is also possible to implement more complex (and robust) solutions on each system, which may would require more significant but possible changes on the current code.

Embodiments are also compatible with performance improvements benefits of features such as a VM function (VMFunc) instruction, which allows software to invoke a VMFunc to expose additional functionalities in the hypervisor. VMFunc provides a new path to access functionalities within the hypervisor without the necessity to use VMExit handlers and thus provides an important performance improvement. Embodiments being compatible with VMFunc instructions provide even more important advantages as a result.

Some existing solutions may potentially be able to simulate some similar functionalities as those of embodiments (at different levels), but would demand kernel-level components in the VMM to isolate the parts of the code that belongs to a leak barrier/leak zone, thus making it much more complex to implement and demanding changes in the programing paradigms, as opposed to embodiments, where instructions according to embodiments may be automatically inserted by compiler-made decisions. Using paging can also greatly affect performance if various parts of the program are divided, leading to two possible choices: either leaving large pieces of code together, thus lowering the effectiveness of the solution, or splitting the code at a much more granular level thus negatively affecting performance. The above is because switching between page contexts as with the prior art solutions that require such page switching may require flushing of caches, whereas embodiments do not.

Some existing solutions to address among other things attacks and system vulnerability are mentioned below.

In segmentation, including the segmentation support in 64 bit long mode, the segment registers are forced to 0 and their limit set to 2^64. Segmentation-based solutions are not easily implemented in a loader of the OS, requiring more complexity for usage. This method is currently hardly being implemented at least for the above reasons.

Memory remapping in general involves changing the maps that define which pages belong to which process, and exposes more of the memory to a given process (or change attributes of a given memory visible to a given process—such as making the memory writable, or read-only, etc.). Memory remapping however can cause a performance impact (as demonstrated by patches to implement in software memory segmentation between kernel and user-mode) in 64 bit long mode.

In addition, instructions initializer and "end", are sometimes used to prevent Return Oriented Programming (ROP)-based exploits. ROP is a computer security exploit technique that allows an attacker to execute code in the presence of security defenses such as non-executable memory and code signing. It includes an "endbranch" instruction that must be presented for a call to be directed to the instruction. With ROP, an attacker gains control of the call stack to hijack program control flow and then executes carefully chosen machine instruction sequences. Instructions initializer and "end" provides a defensive mechanism that acts once the vulnerability is already exploited and the attacker already has flow control such as through ROP. The proposed embodiments aim to avoiding the flow control by the attacker instead.

Moreover, bounds registers (such as Memory Protection Extensions (MPX)) depend on the recompilation of the code and correct compiler decisions, and further do not protect external libraries (since these would also need to be recompiled). Bounds registers aim to prevent attacks, they do not create a connection between which code can access which data. Thus, logical errors are still exploitable in this scenario.

Protection Keys (PKs) on the other hand provide the capability of altering the security properties of pages within a memory, thus leading to better performance, but are limited to supporting only up to 16 groups/guests. Considering multiple guests in a hypervisor environment, where more than 16 guests are typically contemplated, it is very unlikely that VMMs will use PKs to create any relation between the VMM code/data due to the complexity (and error-prone) nature of implementing such a solution. Additionally, the PKs exist for changing the security properties of the pages (in the sense of creating a Read-Write OR Execute (RW^X) mappings, where, if a page is marked as readable and writable, it cannot also be marked as executable—and vice-versa), instead of correlating the pages with the code that is able to access them. An attacker that is able to re-use code (ROP-style), is able to bypass the PKs feature. One of the bigger challenges that helps to distinguish VMM protection from normal software protection is the fact that the guest in a hypervisor environment knows a lot about the memory layout of the host (since a significant part of that layout is from the guest itself).

A secure memory architecture involving memory regions as proposed by millcomputing.com provides an approach of labeling/identifying/tagging memory regions and associating the context. That is, according to this approach, all memory regions are tagged, and memory regions with the correct tag can be accessed. However, this approach that requires a complete change in the entire micro-architecture. The latter solution does potentially offer some of the same effects as some of the embodiments. However, it is not realistic for current architecture design (it not only demands a huge micro-architecture change as noted above, but also does require complex software modifications).

The proposed approach offers the benefits of the isolated areas including leak barrier instructions, an identifier, leak zones, and randomization without the drawbacks, thus being immediately applicable to the current architecture.

Most operating systems would likely use aspects of embodiments for implementing their ASLR and non-execution memory protection mechanisms. VMM vendors would be very likely to use aspects of embodiments to guarantee a secure communication between guests and the host. Security companies may use the idea to protect the kernel components of their products (such as, but not limited to antivirus software or endpoint protection (AVs)).

Figure 4:
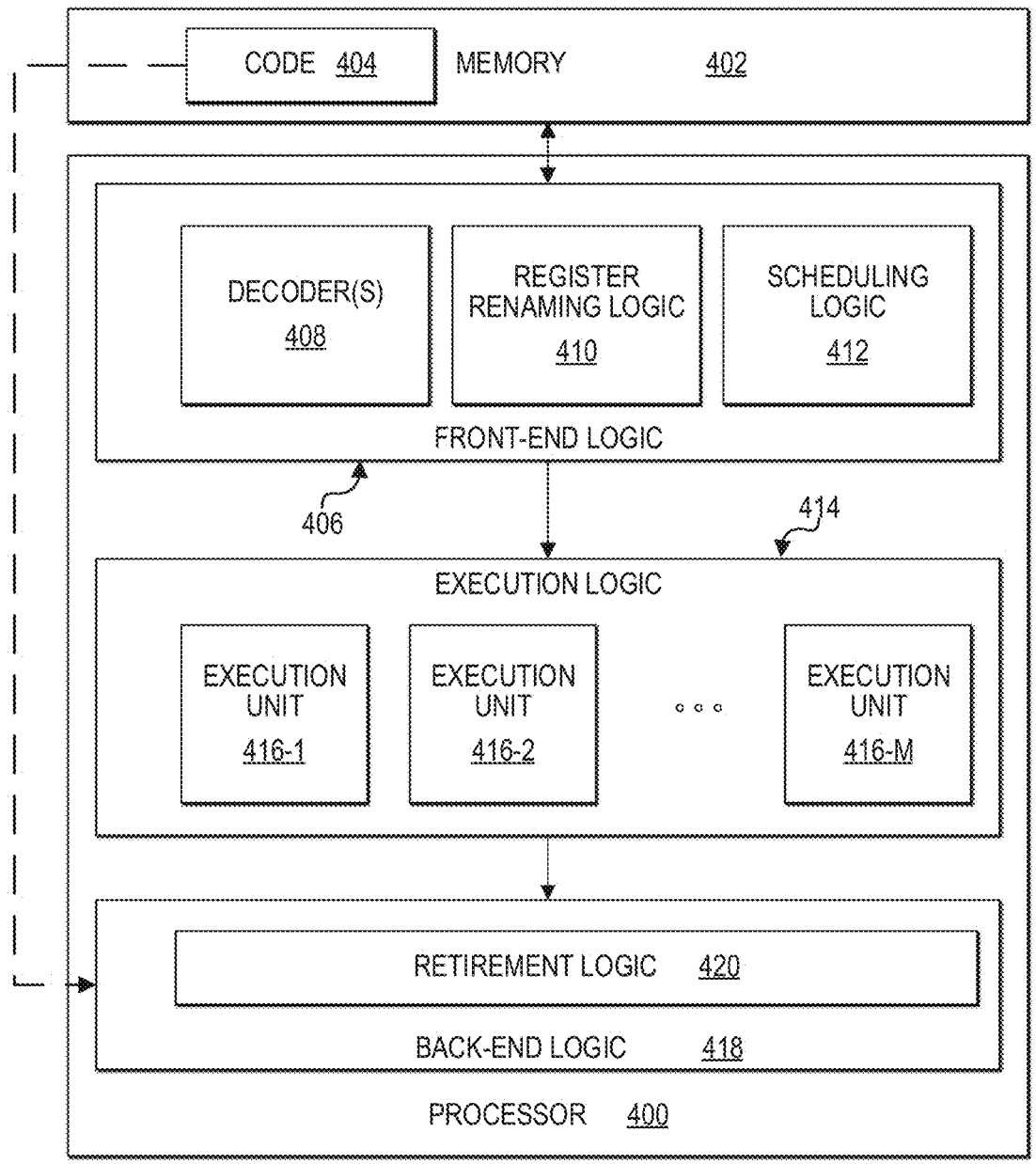
FIG. 4 is a block diagram illustrating an example processor core and memory according to at least one embodiment.
Figure 5:
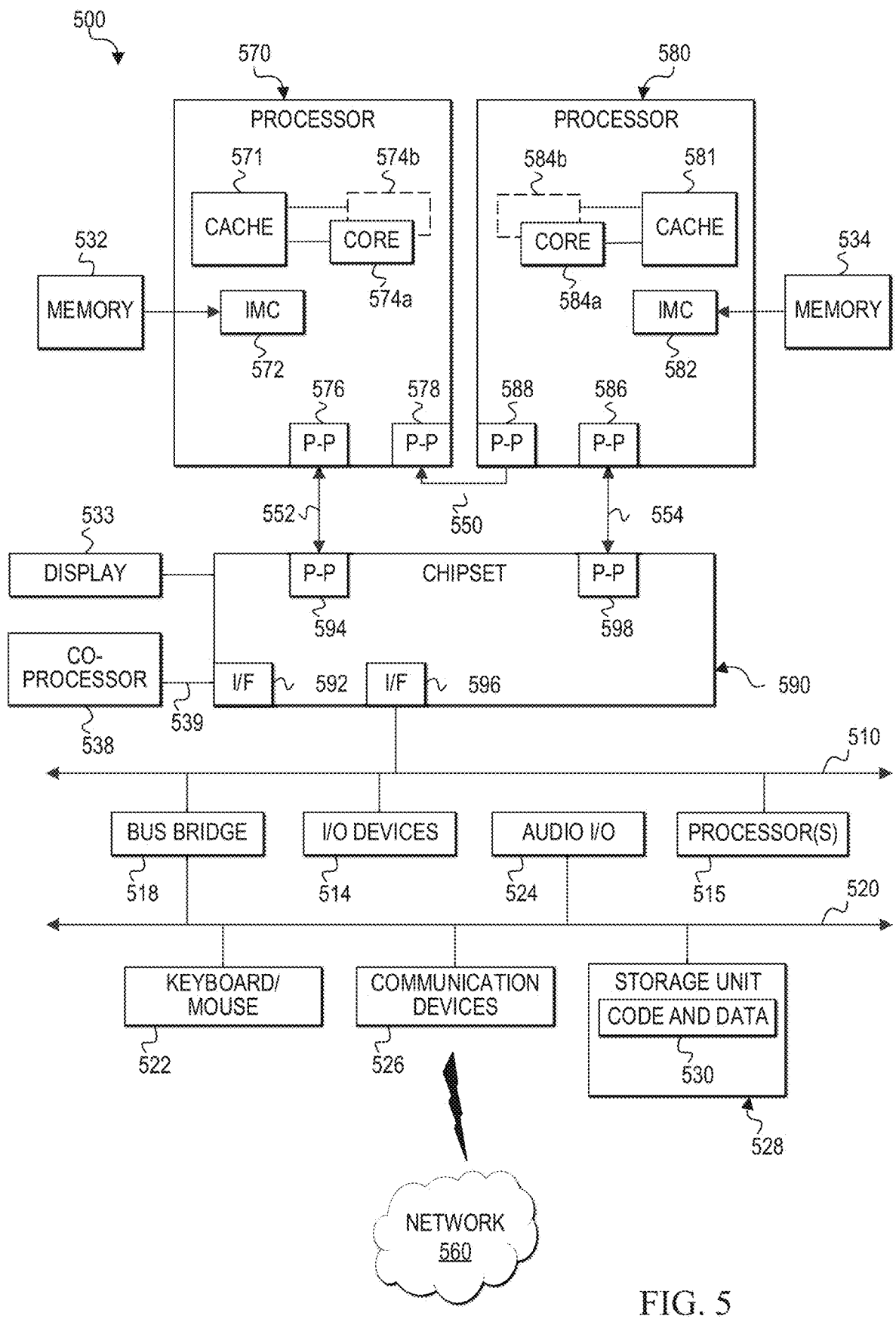
FIG. 5 is a block diagram of an example computing system according to at least one embodiment.
Figure 6:
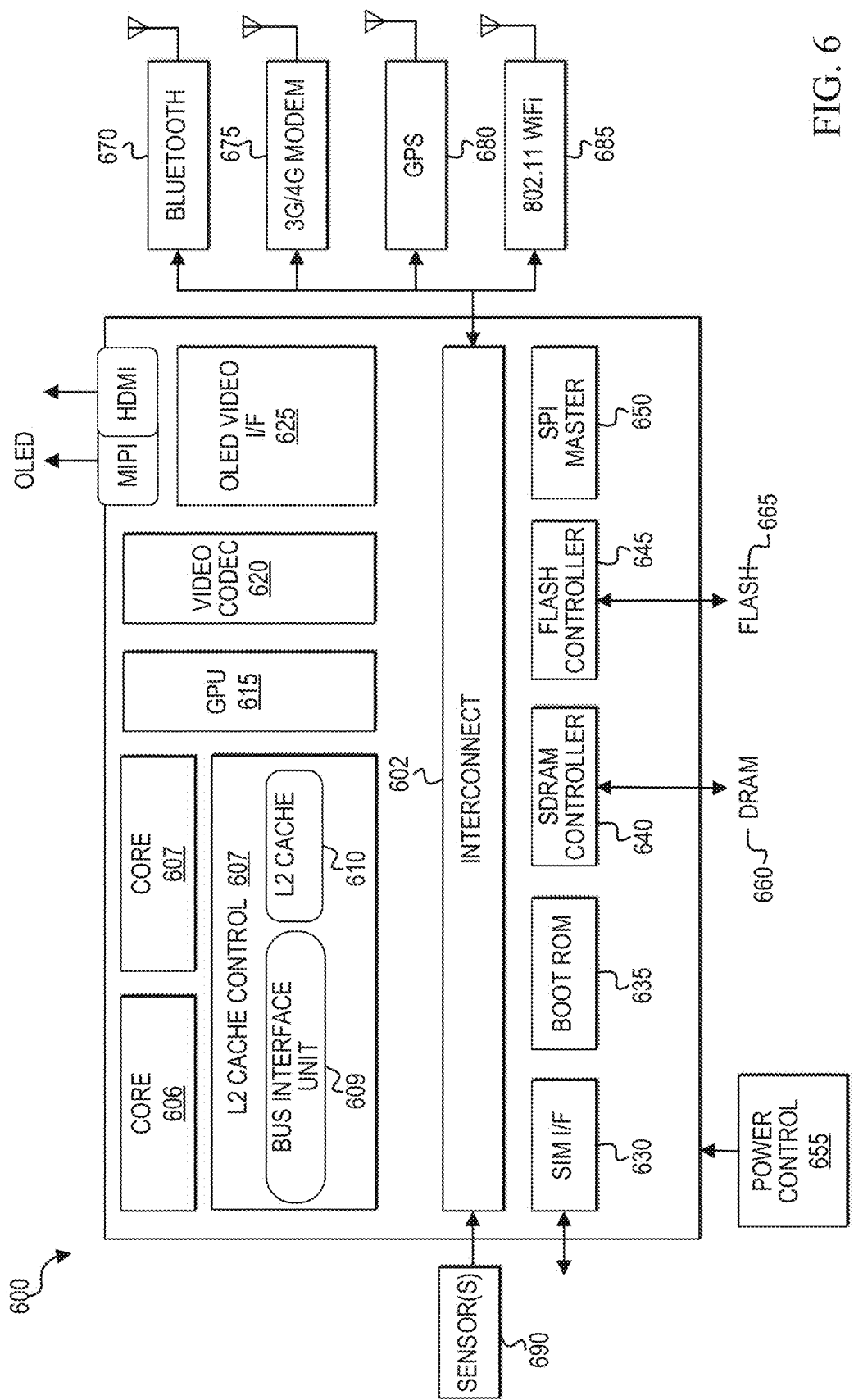
FIG. 6 is a block diagram of an example system-on-a-chip (SoC) computer architecture for a computing system according to at least one embodiment.

FIGS. 4-6 detail exemplary architectures and systems to implement some embodiments. FIGS. 4-6 show by way of example computing systems that may include a processing circuitry, such as processor 102 of FIG. 1, or such as a host associated with the VMM memory layout of FIG. 2. One or more of the processors in FIGS. 4-6 may be adapted to perform the functions of one or more of embodiments described herein. In some embodiments, one or more hardware components and/or instructions described above are emulated as detailed below, or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 4-6.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computing system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. An exemplary processor core is described next followed by computer architectures.

FIG. 4 is an example illustration of a processor according to an embodiment. Processor 400 is one example embodiment of processors that may be used in embodiments herein such as the processor 102 of FIG. 1 or a host for VMM memory layout 200 of FIG. 2. Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 is one example of memory elements including at least one of system memory device 104 of FIG. 1 or logical memory such as one defining a leak zones as depicted by way of VMM memory layout 200 of FIG. 2. Memory 402 may be any of a wide variety of memories (including various layers of memory hierarchy) as are known or otherwise available to those of skill in the art. Such memory elements can include, but are not limited to, logical memory, random access memory (RAM), read only memory (ROM), logic blocks of a field programmable gate array (FPGA), erasable programmable read only memory (EPROM), and electrically erasable programmable ROM (EEPROM). Processor 400 can execute any type of instructions associated with the monitoring and analyzing operations detailed herein. Generally, processor 400 can transform an element or an article (e.g., data) from one state or thing to another state or thing.

Code 404, which may be one or more instructions to be executed by processor 400, may be stored in memory 402. Code 404 can include instructions corresponding to various operations (e.g., the operations described above in relation to FIGS. 1-3) that may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416-1 through 416-M. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The I/O control logic may control the operation of an I/O interface such as an I/O interface of the processor 102 FIG. 1 or of the host associated with the VMM memory layout 200 of FIG. 2. The processing element may also include one or more caches. In some embodiments, non-volatile memory (such as flash memory or fuses) may also be included on the chip with processor 400.

FIGS. 4 and 5 are block diagrams of exemplary computer architectures of a computing system, such as a computing system including the computing system 100 of FIG. 1, or a host such as the host associated with the VMM memory layout 200 of FIG. 2. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable. In general, a huge variety of systems or electronic devices capable of incorporating a processor and/or other execution logic as disclosed herein are generally suitable.

Referring now to FIG. 5, shown is a block diagram of an example computing system 500 in accordance with one or more embodiments of the present disclosure. As shown in FIG. 5, multiprocessor system 500 is a point-to-point interconnect system, and includes a first processor 570 and a second processor 580 coupled via a point-to-point interconnect 550. In at least one embodiment, the processor 102 of FIG. 1 or the host associated with VMM memory layout 200 of FIG. 2, as shown and described herein, may be configured in the same or similar manner as the processors in exemplary computing system 500. Processors 570 and 580 may be any type of processor.

Processors 570 and 580 may be implemented as single core processors 574a and 584a or multi-core processors 574a-574b and 584a-584b. Processors 570 and 580 may each include a cache 571 and 581 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 570 and 580 are shown including integrated memory controller (IMC) units 572 and 582, respectively. IMCs 572 and 582 couple the processors to respective memories, namely a memory 532 and a memory 534, which may be portions of main memory locally attached to the respective processors, or which may include portions of logical memory in a VMM environment. In alternative embodiments, memory controller logic 572 and 582 may be discreet logic separate from processors 570 and 580. Memory elements 532 and/or 534 may store various data to be used by processors 570 and 580 in achieving operations such as the ones described above in relation to FIGS. 1-3.

Processor 570 also includes as part of its bus controller units, point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539 by via of I/F interface 592. In one embodiment, the coprocessor 538 is a special-purpose processor, such as, for example, a high-throughput MIC processor, a network or communication processor, compression engine, graphics processor, GPGPU, embedded processor, or the like. Chipset 590 may also communicate with a display 533 for displaying data that is viewable by a human user.

As shown herein, chipset 590 is separated from processing elements 570 and 580. However, in an embodiment, chipset 590 is integrated on the same chip as processing elements 570 and 580. Also, chipset 590 may be partitioned differently with fewer or more integrated circuits.

Chipset 590 may be coupled to a first bus 510 via an interface 596. In one embodiment, first bus 510 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 510, along with a bus bridge 518 which couples first bus 510 to a second bus 520. In one embodiment, one or more additional processor(s) 515, such as coprocessors, high-throughput MIC processors, GPGPU's, accelerators (such as, e.g., graphics accelerators or digital signal processing (DSP) units), AI accelerators, field programmable gate arrays, or any other processor, are coupled to first bus 510. I/O devices 514 may include peripheral devices (including sensors) that provide information and/or instructions to processors 570 and 580 for processing or storage. Some peripheral devices also (or alternatively) provide a way for processors 570 and 580 to output information to users or other computing systems. Sensors may include, for example, video and/or still image sensors, audio sensors, touch sensors, fingerprint sensors, eye sensors, facial features sensors, other biometric sensors, etc. In one example, sensors detect user authentication input and in accordance with at least one embodiment, encrypt the input using the current symmetric key, and provide the symmetric-key encrypted user authentication input to processors 570 and 580.

In one embodiment, second bus 520 may be a low pin count (LPC) bus. Various devices may be coupled to a second bus 520 including, for example, a keyboard and/or mouse 522 (or other input devices such as a touch screen, trackball, joystick, etc.), communication devices 526 (such as modems, network interface controllers/devices, or other types of communication devices that may communicate through a network 560), and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

The computing system depicted in FIG. 5 is a schematic illustration of an embodiment that may be utilized to implement various embodiments discussed herein. It will be appreciated that various components of the system depicted in FIG. 5 may be combined in a system-on-a-chip (SoC) architecture or in any other suitable configuration capable of achieving the protection of communications between a sensor and a computing platform using symmetric key cryptography, according to the various embodiments provided herein.

Turning to FIG. 6, FIG. 6 is a simplified block diagram associated with an example Advanced RISC Machines (ARM) ecosystem system-on-chip (SOC) 500 of the present disclosure. At least one example implementation of the present disclosure can include the any of the processors discussed herein, and an ARM component. For example, in at least some embodiments, processor 102, shown and described herein, or a host associated with the VMM memory layout 200 of FIG. 2, could be configured in the same or similar manner as ARM ecosystem SOC 500. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, wearable electronic device, any type of touch-enabled input device, etc.

In this example of FIG. 6, ARM ecosystem SOC 600 may include multiple cores 606-607, an L2 cache control 607, a bus interface unit 609, an L2 cache 610, a graphics processing unit (GPU) 615, an interconnect 602, a video codec 620, and an organic light emitting diode (OLED) I/F 625, which may be associated with mobile industry processor interface (MIPI)/high-definition multimedia interface (HDMI) links that couple to an OLED display.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, flash 665, and one or more sensors 690. In addition, one or more example embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Embodiments of the mechanisms disclosed herein may be implemented in hardware, software, firmware, or a combination of such implementation approaches. Embodiments of this disclosure may be implemented, at least in part, as computer programs or program code executing on programmable systems comprising at least one processor, a storage system (including volatile and non-volatile memory and/or storage elements), at least one input device, and at least one output device.

Program code (e.g., 304, 530), may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk re-writables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Note that with the numerous examples provided herein, interaction may be described in terms of two, three, four, or more devices, processors, processing circuitries, cores, and/ or other components. However, this has been done for purposes of clarity and example only. It should be appreciated that a computing system according to embodiments can be divided (e.g., segmented, partitioned, separated, etc.) in any suitable manner. For example, processor 102 of FIG. 1, or a host associated with the VMM memory layout 200 of FIG. 2, may be provided in alternative configurations such that multiple hosts, nodes, network elements, devices, etc., coordinate to perform the activities one or various combinations of the above components. It should be appreciated that the embodiments illustrated in the instant disclosure are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGS. illustrate only some of the possible scenarios that may be executed by, or within, a computing system, such as the computing system 100 shown in FIG. 1 and the host associated the VMM memory layout 200 of FIG. 2. Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, or Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification.

Example 1 includes an apparatus of a computing system, the apparatus including processing circuitry including a core, and a communication controller coupled to the core to communicate with a memory of the computing system, wherein: the memory is to define a leak zone corresponding to a plurality of memory addresses including data therein, the leak zone having an identifier; and the processing circuitry is to: decode instructions including a starting leak barrier, an ending leak barrier, and a sequence of code between the starting and ending leak barriers, the sequence of code including the identifier for the leak zone, the identifier to indicate the sequence of code is to be executed only on the data within the leak zone; and execute the sequence of code only on the data within the leak zone based on the leak barriers and on the identifier.

Example 2 includes the subject matter of Example 1, and optionally, wherein the starting leak barrier and the ending leak barrier respectively correspond to instructions including "lbstart" and "lbend", and wherein the identifier corresponds to an instruction including "per-pte".

Example 3 includes the subject matter of Example 1, and optionally, further including the memory, wherein the identifier includes an integer, and the leak zone includes a plurality of pages corresponding to the addresses defining the leak zone, each of the pages having a mark corresponding to the integer.

Example 4 includes the subject matter of Example 1, and optionally, wherein the starting leak barrier includes a plurality of starting leak barriers corresponding to the leak zone, and wherein the ending leak barrier defines an end of the sequence of code to be executed on the data for all of the plurality of starting leak barriers.

Example 5 includes the subject matter of Example 1, and optionally, wherein: the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; the memory is to define a second leak zone different from the first leak zone corresponding to a plurality of memory addresses including second data therein, the second leak zone having a second identifier; and the processing circuitry is to: decode second instructions including a second starting leak barrier, a second ending leak barrier, and a second sequence of code between the second starting and second ending leak barriers, the second sequence of code including the second identifier for the second leak zone, the second identifier to indicate the second sequence of code is to be executed only on the data within the second leak zone; and execute the second sequence of code only on the second data within the second leak zone based on the second starting and second ending leak barriers and on the second identifier.

Example 6 includes the subject matter of Example 5, and optionally, wherein the first sequence of code and the second sequence of code are nested with respect to one another.

Example 7 includes the subject matter of Example 5, and optionally, further including the memory, wherein: the computing system includes a host to implement a hypervisor; the first instructions and the second instructions are associated, respectively, with a first guest and a second guest, the first guest and the second guest in a computing network including the host; the first sequence of code and the second sequence of code each include, respectively, a first offset instruction and a second offset instruction; the processing circuitry is to: execute the first offset instruction to perform a first address space layout randomization (ASLR) on the first leak zone based on a first offset; and execute the second offset instruction to perform a second address space layout randomization (ASLR) on the second leak zone based on a second offset different from the first offset; and the first leak zone and the second leak zone are to store information on, respectively, the first offset and the second offset.

Example 8 includes the subject matter of Example 7, and optionally, wherein the processing circuitry is to decode and execute flow instructions to zero the first offset between an execution by the processing circuitry of the first offset instruction and an execution by the processing circuitry of the second offset instruction.

Example 9 includes the subject matter of Example 7, and optionally, further including a randomization offset register, wherein the first offset instruction and the second offset instruction are from the randomization offset register, the randomization offset register to store the first offset and the second offset.

Example 10 includes the subject matter of Example 7, and optionally, further including a code segment register wherein the first offset instruction and the second offset instruction are from a code segment register, the code segment register to store the first offset and the second offset.

Example 11 includes the subject matter of Example 1, and optionally, further including a network interface controller to receive guest instructions from one or more guests over a computing network, the instructions associated with the instructions including the starting leak barrier and the ending leak barrier.

Example 12 includes a product comprising one or more tangible computer-readable non-transitory storage media comprising computer-executable instructions operable to, when executed by at least one computer processor, cause the at least one computer processor to implement operations at a computing system, the operations comprising: decoding instructions including a starting leak barrier, an ending leak barrier, and a sequence of code between the starting and ending leak barriers, the sequence of code including an identifier for a leak zone of a memory, the leak zone corresponding to a plurality of memory addresses including data therein, the leak zone having an identifier, the identifier to indicate the sequence of code is to be executed only on the data within the leak zone; and executing the sequence of code only on the data within the leak zone based on the leak barriers and on the identifier.

Example 13 includes the subject matter of Example 12, and optionally, wherein the starting leak barrier and the ending leak barrier respectively include instructions including "lbstart" and "lbend", and wherein the identifier corresponds to an instruction including "per-pte".

Example 14 includes the subject matter of Example 12, and optionally, wherein the identifier includes an integer, and the leak zone includes a plurality of pages corresponding to the addresses defining the leak zone, each of the pages having a mark corresponding to the integer.

Example 15 includes the subject matter of Example 12, and optionally, wherein the starting leak barrier includes a plurality of starting leak barriers corresponding to the leak zone, and wherein the ending leak barrier defines an end of the sequence of code to be executed on the data for all of the plurality of starting leak barriers.

Example 16 includes the subject matter of Example 12, and optionally, wherein: the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; and the operations further include: decoding second instructions including a second starting leak barrier, a second ending leak barrier, and a second sequence of code between the second starting and second ending leak barriers, the second sequence of code including a second identifier for a second leak zone of the memory, the second identifier to indicate the second sequence of code is to be executed only on second data within the second leak zone; and executing the second sequence of code only on the second data within the second leak zone based on the second starting and second ending leak barriers and on the second identifier.

Example 17 includes the subject matter of Example 16, and optionally, wherein the first sequence of code and the second sequence of code are nested with respect to one another.

Example 18 includes the subject matter of Example 16, and optionally, wherein: the computing system includes a host to implement a hypervisor; the first instructions and the second instructions are associated with, respectively, a first guest and a second guest in a computing network including the host; the first sequence of code and the second sequence of code each include, respectively, a first offset instruction and a second offset instruction; and the operations further include: executing the first offset instruction to perform a first address space layout randomization (ASLR) on the first leak zone based on a first offset; and executing the second offset instruction to perform a second address space layout randomization (ASLR) on the second leak zone based on a second offset different from the first offset; and storing information on the first offset and the second offset in, respectively, the first leak zone and the second leak zone.

Example 19 includes the subject matter of Example 18, and optionally, wherein the operations further include decoding and executing flow instructions to zero the first offset between executing the first offset instruction and executing the second offset instruction.

Example 20 includes the subject matter of Example 18, and optionally, the operations further including storing the first offset instruction, the second offset instruction, the first offset and the second offset in a randomization offset register.

Example 21 includes the subject matter of Example 18, and optionally, the operations further including storing the first offset instruction, the second offset instruction, the first offset and the second offset in a code segment register.

Example 22 includes the subject matter of Example 12, and optionally, the operations further including receiving guest instructions from one or more guests over a computing network, the instructions associated with the instructions including the starting leak barrier and the ending leak barrier.

Example 23 includes a method to be implemented at a computing system, the method comprising: decoding instructions including a starting leak barrier, an ending leak barrier, and a sequence of code between the starting and ending leak barriers, the sequence of code including an identifier for a leak zone of a memory of the computing system, the leak zone corresponding to a plurality of memory addresses including data therein, the leak zone having an identifier, the identifier to indicate the sequence of code is to be executed only on the data within the leak zone; and executing the sequence of code only on the data within the leak zone based on the leak barriers and on the identifier.

Example 24 includes the subject matter of Example 23, and optionally, wherein the starting leak barrier and the ending leak barrier respectively include instructions including "Ibstart" and "Ibend", and wherein the identifier corresponds to an instruction including "per-pte".

Example 25 includes the subject matter of Example 23, and optionally, wherein the identifier includes an integer, and the leak zone includes a plurality of pages corresponding to the addresses defining the leak zone, each of the pages having a mark corresponding to the integer.

Example 26 includes the subject matter of Example 23, and optionally, wherein the starting leak barrier includes a plurality of starting leak barriers corresponding to the leak zone, and wherein the ending leak barrier defines an end of the sequence of code to be executed on the data for all of the plurality of starting leak barriers.

Example 27 includes the subject matter of Example 23, and optionally, wherein: the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; and the method further includes: decoding second instructions including a second starting leak barrier, a second ending leak barrier, and a second sequence of code between the second starting and second ending leak barriers, the second sequence of code including a second identifier for a second leak zone of the memory, the second identifier to indicate the second sequence of code is to be executed only on second data within the second leak zone; and executing the second sequence of code only on the second data within the second leak zone based on the second starting and second ending leak barriers and on the second identifier.

Example 28 includes the subject matter of Example 27, and optionally, wherein the first sequence of code and the second sequence of code are nested with respect to one another.

Example 29 includes the subject matter of Example 27, and optionally, wherein: the computing system includes a host to implement a hypervisor; the first instructions and the second instructions are associated with, respectively, a first guest and a second guest in a computing network including the host; the first sequence of code and the second sequence of code each include, respectively, a first offset instruction and a second offset instruction; and the method further includes: executing the first offset instruction to perform a first address space layout randomization (ASLR) on the first leak zone based on a first offset; and executing the second offset instruction to perform a second address space layout randomization (ASLR) on the second leak zone based on a second offset different from the first offset; and storing information on the first offset and the second offset in, respectively, the first leak zone and the second leak zone.

Example 30 includes the subject matter of Example 29, and optionally, the method further including decoding and executing flow instructions to zero the first offset between executing the first offset instruction and executing the second offset instruction.

Example 31 includes the subject matter of Example 29, and optionally, the method further including storing the first offset instruction, the second offset instruction, the first offset and the second offset in a randomization offset register.

Example 32 includes the subject matter of Example 29, and optionally, the method further including storing the first offset instruction, the second offset instruction, the first offset and the second offset in a code segment register.

Example 33 includes the subject matter of Example 23, and optionally, the method further including receiving guest instructions from one or more guests over a computing network, the instructions associated with the instructions including the starting leak barrier and the ending leak barrier.

Example 34 includes an apparatus of a computing system, the apparatus including: means for decoding instructions including a starting leak barrier, an ending leak barrier, and a sequence of code between the starting and ending leak barriers, the sequence of code including an identifier for a leak zone of a memory, the leak zone corresponding to a plurality of memory addresses including data therein, the leak zone having an identifier, the identifier to indicate the sequence of code is to be executed only on the data within the leak zone; and means for executing the sequence of code only on the data within the leak zone based on the leak barriers and on the identifier.

Example 35 includes the subject matter of Example 34, and optionally, wherein the starting leak barrier and the ending leak barrier respectively include instructions including "Ibstart" and "Ibend", and wherein the identifier corresponds to an instruction including "per-pte".

Example 36 includes the subject matter of Example 34, and optionally, wherein the identifier includes an integer, and the leak zone includes a plurality of pages corresponding to the addresses defining the leak zone, each of the pages having a mark corresponding to the integer.

Example 37 includes the subject matter of Example 34, and optionally, wherein the starting leak barrier includes a plurality of starting leak barriers corresponding to the leak zone, and wherein the ending leak barrier defines an end of the sequence of code to be executed on the data for all of the plurality of starting leak barriers.

Example 38 includes the subject matter of Example 34, and optionally, wherein: the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; and the apparatus further includes: means for decoding second instructions including a second starting leak barrier, a second ending leak barrier, and a second sequence of code between the second starting and second ending leak barriers, the second sequence of code including a second identifier for a second leak zone of the memory, the second identifier to indicate the second sequence of code is to be executed only on second data within the second leak zone; and means for executing the second sequence of code only on the second data within the second leak zone based on the second starting and second ending leak barriers and on the second identifier.

Example 39 includes the subject matter of Example 38, and optionally, wherein the first sequence of code and the second sequence of code are nested with respect to one another.

Example 40 includes the subject matter of Example 38, and optionally, wherein: the computing system includes a host to implement a hypervisor; the first instructions and the second instructions are associated with, respectively, a first guest and a second guest in a computing network including the host; the first sequence of code and the second sequence of code each include, respectively, a first offset instruction and a second offset instruction; and the apparatus further includes: means for executing the first offset instruction to perform a first address space layout randomization (ASLR) on the first leak zone based on a first offset; means for executing the second offset instruction to perform a second address space layout randomization (ASLR) on the second leak zone based on a second offset different from the first offset; and means for storing information on the first offset and the second offset in, respectively, the first leak zone and the second leak zone.

Example 41 includes the subject matter of Example 40, and optionally, the apparatus further including means for decoding and executing flow instructions to zero the first offset between executing the first offset instruction and executing the second offset instruction.

Example 42 includes the subject matter of Example 40, and optionally, the apparatus further including means for storing the first offset instruction, the second offset instruction, the first offset and the second offset in a randomization offset register.

Example 43 includes the subject matter of Example 40, and optionally, the apparatus further including means for storing the first offset instruction, the second offset instruction, the first offset and the second offset in a code segment register.

Example 44 includes the subject matter of Example 34, and optionally, the apparatus further including means for receiving guest instructions from one or more guests over a computing network, the instructions associated with the instructions including the starting leak barrier and the ending leak barrier.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus of a computing system, the apparatus including processing circuitry including a core, and a communication controller coupled to the core to communicate with a memory of the computing system, wherein:
   the memory is to define a leak zone corresponding to a plurality of memory addresses including data therein, the leak zone having an identifier; and
   the processing circuitry is to:
      decode instructions including the identifier for the leak zone, the instructions further including a starting leak barrier, an ending leak barrier, and a sequence of code between the starting and ending leak barriers, the starting leak barrier to indicate a start of the sequence of code, and the ending leak barrier to indicate an end of the sequence of code, the identifier to indicate the sequence of code is to be executed only on the data within the leak zone; and
      execute the sequence of code only on the data within the leak zone based on the leak barriers and on the identifier.

2. The apparatus of claim 1, wherein the starting leak barrier and the ending leak barrier respectively correspond to instructions including "Ibstart" and "Ibend", and wherein the identifier corresponds to an instruction including "per-pte".

3. The apparatus of claim 1, further including the memory, wherein the identifier includes an integer, and the leak zone includes a plurality of pages corresponding to the addresses defining the leak zone, each of the pages having a mark corresponding to the integer.

4. The apparatus of claim 1, wherein the starting leak barrier includes a plurality of starting leak barriers corresponding to the leak zone, and wherein the ending leak barrier defines an end of the sequence of code to be executed on the data for all of the plurality of starting leak barriers.

5. The apparatus of claim 1, wherein:
   the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code;

the memory is to define a second leak zone different from the first leak zone corresponding to a plurality of memory addresses including second data therein, the second leak zone having a second identifier; and the processing circuitry is to:

decode second instructions including a second starting leak barrier, a second ending leak barrier, and a second sequence of code between the second starting and second ending leak barriers, the second sequence of code including the second identifier for the second leak zone, the second identifier to indicate the second sequence of code is to be executed only on the data within the second leak zone; and execute the second sequence of code only on the second data within the second leak zone based on the second starting and second ending leak barriers and on the second identifier.

6. The apparatus of claim 5, wherein the first sequence of code and the second sequence of code are nested with respect to one another.

7. The apparatus of claim 5, further including the memory, wherein:

the computing system includes a host to implement a hypervisor;

the first instructions and the second instructions are associated, respectively, with a first guest and a second guest, the first guest and the second guest in a computing network including the host;

the first sequence of code and the second sequence of code each include, respectively, a first offset instruction and a second offset instruction; and the processing circuitry is to:

execute the first offset instruction to perform a first address space layout randomization (ASLR) on the first leak zone based on a first offset; and execute the second offset instruction to perform a second address space layout randomization (ASLR) on the second leak zone based on a second offset different from the first offset; and the first leak zone and the second leak zone are to store information based on, respectively, the first offset and the second offset.

8. The apparatus of claim 7, wherein the processing circuitry is to decode and execute flow instructions to zero the first offset between an execution by the processing circuitry of the first offset instruction and an execution by the processing circuitry of the second offset instruction.

9. The apparatus of claim 7, further including a randomization offset register, wherein the first offset instruction and the second offset instruction are from the randomization offset register, the randomization offset register to store the first offset and the second offset.

10. The apparatus of claim 7, further including a code segment register wherein the first offset instruction and the second offset instruction are from a code segment register, the code segment register to store the first offset and the second offset.

11. The apparatus of claim 1, further including a network interface controller to receive guest instructions from one or more guests over a computing network, the guest instructions associated with the instructions including the starting leak barrier and the ending leak barrier.

12. A product comprising one or more tangible computer-readable non-transitory storage media comprising computer-executable instructions operable to, when executed by at least one computer processor, cause the at least one computer processor to implement operations at a computing system, the operations comprising:

decoding instructions including an identifier for a leak zone of a memory, the instructions further including a starting leak barrier, an ending leak barrier, and a sequence of code between the starting and ending leak barriers, the starting leak barrier to indicate a start of the sequence of code, and the ending leak barrier to indicate an end of the sequence of code, the leak zone corresponding to a plurality of memory addresses including data therein, the leak zone having an identifier, the identifier to indicate the sequence of code is to be executed only on the data within the leak zone; and executing the sequence of code only on the data within the leak zone based on the leak barriers and on the identifier.

13. The product of claim 12, wherein the starting leak barrier and the ending leak barrier respectively include instructions including "lbstart" and "lbend", and wherein the identifier corresponds to an instruction including "perpte".

14. The product of claim 12, wherein the identifier includes an integer, and the leak zone includes a plurality of pages corresponding to the addresses defining the leak zone, each of the pages having a mark corresponding to the integer.

15. The product of claim 12, wherein:

the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; and the operations further include:

decoding second instructions including a second starting leak barrier, a second ending leak barrier, and a second sequence of code between the second starting and second ending leak barriers, the second sequence of code including a second identifier for a second leak zone of the memory, the second identifier to indicate the second sequence of code is to be executed only on second data within the second leak zone; and executing the second sequence of code only on the second data within the second leak zone based on the second starting and second ending leak barriers and on the second identifier.

16. The product of claim 15, wherein:

the computing system includes a host to implement a hypervisor;

the first instructions and the second instructions are associated with, respectively, a first guest and a second guest in a computing network including the host;

the first sequence of code and the second sequence of code each include, respectively, a first offset instruction and a second offset instruction; and the operations further include:

executing the first offset instruction to perform a first address space layout randomization (ASLR) on the first leak zone based on a first offset; and executing the second offset instruction to perform a second address space layout randomization (ASLR)

on the second leak zone based on a second offset different from the first offset; and storing information based on the first offset and the second offset in, respectively, the first leak zone and the second leak zone.

17. The product of claim 16, wherein the operations further include decoding and executing flow instructions to zero the first offset between executing the first offset instruction and executing the second offset instruction.

18. The product of claim 16, the operations further including storing the first offset instruction, the second offset instruction, the first offset and the second offset in a randomization offset register.

19. A method to be implemented at a computing system, the method comprising:

decoding instructions decoding instructions including an identifier for a leak zone of a memory, the instructions further including a starting leak barrier, an ending leak barrier, and a sequence of code between the starting and ending leak barriers, the starting leak barrier to indicate a start of the sequence of code, and the ending leak barrier to indicate an end of the sequence of code, the leak zone corresponding to a plurality of memory addresses including data therein, the leak zone having an identifier, the identifier to indicate the sequence of code is to be executed only on the data within the leak zone; and executing the sequence of code only on the data within the leak zone based on the leak barriers and on the identifier.

20. The method of claim 19, wherein the starting leak barrier and the ending leak barrier respectively include instructions including "lbstart" and "lbend", and wherein the identifier corresponds to an instruction including "perpte".

21. The method of claim 19, wherein the starting leak barrier includes a plurality of starting leak barriers corresponding to the leak zone, and wherein the ending leak barrier defines an end of the sequence of code to be executed on the data for all of the plurality of starting leak barriers.

22. The method of claim 19, wherein:

the instructions include first instructions, the leak zone includes a first leak zone, the plurality of memory addresses includes a plurality of first addresses, the data includes first data, the starting leak barrier includes a first starting leak barrier, the ending leak barrier includes a first ending leak barrier, and the sequence of code includes a first sequence of code; and the method further includes:

decoding second instructions including a second starting leak barrier, a second ending leak barrier, and a second sequence of code between the second starting and second ending leak barriers, the second sequence of code including a second identifier for a second leak zone of the memory, the second identifier to indicate the second sequence of code is to be executed only on second data within the second leak zone; and executing the second sequence of code only on the second data within the second leak zone based on the second starting and second ending leak barriers and on the second identifier.

23. The method of claim 22, wherein:

the computing system includes a host to implement a hypervisor;

the first instructions and the second instructions are associated with, respectively, a first guest and a second guest in a computing network including the host;

the first sequence of code and the second sequence of code each include, respectively, a first offset instruction and a second offset instruction; and the method further includes:

executing the first offset instruction to perform a first address space layout randomization (ASLR) on the first leak zone based on a first offset; and executing the second offset instruction to perform a second address space layout randomization (ASLR) on the second leak zone based on a second offset different from the first offset; and storing information based on the first offset and the second offset in, respectively, the first leak zone and the second leak zone.

24. The method of claim 23, the method further including decoding and executing flow instructions to zero the first offset between executing the first offset instruction and executing the second offset instruction.

25. The method of claim 23, the method further including storing the first offset instruction, the second offset instruction, the first offset and the second offset in a randomization offset register.

* * * * *